United States Patent [19]

Panda et al.

[11] Patent Number: 4,732,719

[45] Date of Patent: Mar. 22, 1988

[54] SUPERPLASTIC FORGING NITRIDE CERAMICS

[75] Inventors: Prakash C. Panda; Edgar R. Seydel; Rishi Raj, all of Ithaca, N.Y.

[73] Assignee: Jupiter Technologies, Inc., Ithaca, N.Y.

[21] Appl. No.: 816,040

[22] Filed: Jan. 3, 1986

[51] Int. Cl.$^4$ .............................................. C04B 33/32
[52] U.S. Cl. ....................................... 264/65; 264/66; 264/325; 264/332
[58] Field of Search ................... 264/65, 66, 1.2, 325, 264/332

[56] References Cited

U.S. PATENT DOCUMENTS

| | | | |
|---|---|---|---|
| 4,126,653 | 11/1978 | Smith et al. | 264/65 |
| 4,143,107 | 3/1979 | Ishii et al. | 264/65 |
| 4,296,065 | 10/1981 | Ishii et al. | 264/332 |
| 4,410,468 | 10/1983 | Packer | 264/1.2 |
| 4,487,840 | 12/1984 | Raj | 501/97 |
| 4,552,711 | 11/1985 | Raj | 264/65 |

OTHER PUBLICATIONS

Alper, A. M., High Temperature Oxides, Part III, Academic Press (1970), pp. 235–281.
Baudelet, B., Superplasticity Conference Internationale, Grenoble, France, 9/16–19/1985, pp. 16.1–16.19.
Briselle, L. A. et al., J. Amer. Ceramic Soc., vol. 49, No. 3, pp. 165–166 (3/66).
Burke, J. J. et al., Advances in Deformation Processing, pp. 405–421, Plenum Press, NY, 1978.
Extended Abstracts, American Ceramic Society, 87th Annual Meeting, 5/5–5/9, 1985, p. 298, Abstract 12-FH'485.
Heuer, A. H. et al., J. of American Ceramic Society, vol. 52(9), pp. 468–474 (1969).
High-Tech Materials Alert, 6/85, p. 4.
Panda, P. C., Ph.D., Thesis Titled, "Studies on Phase Transformation Kinetics, Superplastic Deformation and Dynamic Recrystallization of Magnesia-Alumina Spinel, MgO.2Al$_2$O$_3$", Cornell University, Ithaca, NY, 8/84.
Rhodes, W. H. et al., J. of the American Ceramic Society, vol. 58 (No. 1-2), pp. 31–34 (1-2/75).
Riley, F. L., Nitrogen Ceramics, Noodhoff–Leyden (1977), pp. 367–382.
Woodford, D. A., Transactions Quarterly, Transactions of American Society for Metals, vol. 62, No. 1, pp. 291–293 (3/69).
Government Report Announcements, NTIS, vol. 73, No. 13, p. 92, Abstract AD-760353 (1973).
Buckley, P. L., Air Force Wright Aeronautical Labs, Report No. AFWAL-TR-82,2028, 8/82, Wright Patterson AFB, Ohio.
Clark, T. J. et al, Am. Ceram. Soc. Bull., 61(7), 733-6 (1982).

(List continued on next page.)

Primary Examiner—James Derrington

[57] ABSTRACT

The invention relates to producing relatively flaw free silicon nitride ceramic shapes requiring little or no machining by superplastic forging of a sintered or partially sintered preform. The preform is prepared by preparing a starting powder by wet or dry mixing a composition comprising by weight from about 70% to about 99% silicon nitride, from about 1% to about 30% of liquid phase forming additive and from 0 to about 7% free silicon, cold pressing to about a preform of green density ranging from about 1 to about 2.5 megagrams per cubic meter, and at least partially sintering at atmospheric pressure in nitrogen at a temperature ranging from about 1400° C. to about 2200° C. The superplastic forging is carried out by isothermally pressing the preform into substantially final shape utilizing a temperature and strain rate such that surface cracks do not occur, e.g. utilizing a temperature of 1650° C., a substantially constant displacement rate based on an initial strain rate of $2 \times 10^{-4}$ seconds$^{-1}$ and open die processing in a graphite die. The invention is also directed at superplastic forging of other nitrides and composites thereof with particulate titanium carbide.

12 Claims, 3 Drawing Figures

OTHER PUBLICATIONS

Curci, T. J. et al, Materials Science Research, vol. 11, Process of Cryst. Ceram. Proc. of the Univ. Conf. on Ceram. Sci., 14th, NC State Univ. 11/7-9/1977, pp. 359-368.

Dey, S. et al, Am. Ceramic Soc. Bull., 64(4), 571-5 (1985).

Handwerker, C. A. et al, Adv. Ceram., 1983, No. 6, pp. 213-223, C.A. 101:42391n.

Knickerbocker, J. U. et al, vol. 37, NO.-, Pt 3, 1981, Int. Meet on Ferroelectr, IMF-5, 5th, University Park, Pa., 8/17-21, 1981, pp. 733-736.

Knickerbocker, J. U., Department of Energy Report DOE/ER/01198-1396 (1982).

Maguire, E. A. et al, Am. Ceram. Soc. Bull., 60(2), 255 (1981).

Rhodes, William H. et al, Avco Missiles Space and Electronic Group, Lowell Mass Avco Space Systems DIV Report No. AVSSD-0415-67-RR, 30 Jun. 1967.

Sakata, K. et al, Ferroelectrics, vol. 22, No. 1-2, 1978, Proc. of the Int. Meet on Ferroelectr, 4th, Leningrad, USSR, 9/18-23, 1977, pp. 821-824.

Smethurst, E., IEEE Transactions on Magnetics, vol. MAG-6, No. 3, 9/70, p. 618.

Takenaka, T. et al, Proc. Jpn. Congr. Mater. Res., 20th, Kyoto, Jpn., 9/1976, published by Soc. of Mater. Sci., Kyoto, Jpn., 1977, pp. 212-214.

Takenaka, T. et al, Japanese Journal of Applied Physics, vol. 19, No. 1, 1/80, pp. 31-39.

Takenaka, R. et al, Japanese Journal of Applied Physics, 20 (Supp. 20-4), 189-92, 1981.

Takenaka, T. et al, J. Appl. Phys, 55(4), 1092-9 (1984).

Wang, D. et al, J. Chinese Silicate Society, 10(4), 427-437, 1982, C.A. 98:184391f.

Xia, A. et al, Wuli, vol. 13, No. 8, pp. 484'485 (1984), C.A. 102:83221w.

Rhodes, W. H. et al, "Microstructure Studies of Polycrystalline Refractory Compounds", Summary Report, May 1973-Apr. 1974, Avco Corporation, Systems Division, Lowell, Mass., Naval Air Systems Command Contract Report, Jun. 1974 (AD 782647).

SUPERPLASTIC FORGING NITRIDE CERAMICS

This invention herein was made in part under Department of Energy Grant DE-AC01-84ER80167, creating certain rights in the United States Government. The invention was also made in part under New York State Science and Technology Grant SB1R 1985-10.

TECHNICAL FIELD

The field of this invention is fabricating silicon nitride ceramic parts for high temperature use, particularly ones with axisymmetric shapes, e.g. bearings, extrusion dies, gas-turbine disks, valves, cutting tools, cutting blades, knife edges, and the like.

BACKGROUND OF THE INVENTION

The conventional methods for fabricating such parts are pressureless sintering, hot-isostatic pressing, and hot pressing. See Raj et al. U.S. Pat. Nos. 4,487,840 and 4,552,711.

Pressureless sintering is accompanied by non-uniform shrinkage which makes it impossible to meet close tolerances without substantial machining.

Hot-isostatic pressing requires the use of a cladding to separate the pressurizing gas from pores of the powder compact and produces product where flaws are retained.

Hot pressing normally is utilized to press into pancake or billet shapes which are machined into final shape.

SUMMARY OF THE INVENTION

It has been discovered herein that silicon nitride ceramic parts are formed to final shape with little or no machining and without the need for use of cladding by superplastic forging of a fully sintered or partially sintered preform. When operating on a partially sintered preform, the forging step also performs a sintering function in increasing density. Thus, the term sinter forging can be applied to the forging step herein.

The forging step in the process herein provides a high degree of reliability in respect to the ceramic components produced. In other words, the mechanical strengths of several forgings produced under the same conditions lie in a narrow range. This is at least in part because if a preform contains a defect in the shape of a spherical pore, then the deformation herein causes the pore shape to change to that of a disk or a needle, and the elongated or flattened pore shapes break up into small pores which are either removed by further densification or are too small to influence the strength of the ceramic.

The forging step in the process herein produces a different result from pressureless sintering and hot-isostatic pressing in that in respect to pores, it produces both a shape change (configuration change) and a volume change while said conventional processes produce only a volume change. For example, a spherical pore shrinks in volume but remains spherical in shape during pressureless sintering and hot-isostatic pressing. On the other hand, the shear strain embodied in the instant process changes the shape of the pores as described above resulting in the aforedescribed reliability benefit.

The forging in the process herein produces a more uniform densification result than the conventional hot pressing process in respect to intricate shapes. This is because, in hot pressing, loose powder is pressed, and it may not densify uniformly in forming intricate shapes—this leads to poor uniformity in strength among products produced under the same conditions. On the other hand, in the forging step in the instant process a fully or partially sintered preform is used which can be designed to have a shape related to that of the final product so that flow of material during processing can be controlled to provide much more uniform results.

The instant process also is advantageous over the conventional hot pressing process in that the forging step herein can be carried out utilizing either a closed die or an open die whereas hot pressing is only carried out in a closed die. In open die forging, the quantity of the material need not be precisely controlled to obtain a precise shape of the finished part with only finish machining being necessary. Hot pressing requires material control and substantial machining.

The process herein comprises the steps of:
(a) preparing a starting powder by wet or dry mixing ingredients comprising by weight from about 70% to about 99% silicon nitride, from about 1% to about 30% of liquid phase forming additive and from 0 to about 7% silicon;
(b) cold pressing to obtain a preform of green density ranging from about 1 to about 2.5 megagrams per cubic meter, i.e. from about 30% to about 75% of theoretical density;
(c) sintering at atmospheric pressure in a nitrogen atmosphere at a temperature ranging from about 1400° C. to about 2200° C. to obtain a density which ranges from about 50% to about 100% of theoretical density and which is higher than said preform green density, and
(d) isothermally pressing the sintered preform to substantially final shape in a nitrogen atmosphere utilizing a temperature within the range of about 1400° C. to about 2200° C. and strain rate within the range of about $10^{-7}$ to about $10^{-1}$ seconds$^{-1}$ such that surface cracks do not occur, said pressing being carried out to obtain a shear deformation greater than 30% whereby superplastic forging is effected. Such an amount of shear deformation is normally obtained by uniaxially pressing to reduce the vertical height dimension of a specimen in the range of 30% to 60%.

The term "shear deformation" is used herein to mean a change in configuration as distinguished from a change only in volume.

The term "superplastic forging" is used to mean pressing under conditions wherein $1 \leq n \leq 4$ in the equation $$\dot{\epsilon} = C\sigma^n$$

wherein $\dot{\epsilon}$ is the strain rate, C. is a constant related to the starting material, density of the packing and temperature and $\sigma$ is the stress. (See D. A. Woodford, "Strain-Rate Sensitivity as a Measure of Ductility", Transactions of American Society for Metals, 1969, Vol. 62, p. 291. See also J. W. Edington et al., "Superplasticity", Progress in Material Science, 21, No. 2, 1976, pp. 61–169.) Under the conditions herein in isothermally pressing the preform of step (c) utilizing a temperature within the range of about 1400° C. to about 2200° C. and a strain rate ranging from about $10^{-7}$ seconds$^{-1}$ to about $10^{-1}$ seconds$^{-1}$ such that surface cracks do not occur, n always satisfies the relationship $1 \leq n \leq 4$ and superplastic forging thus occurs.

DETAILED DESCRIPTION OF THE INVENTION

Figure 1:
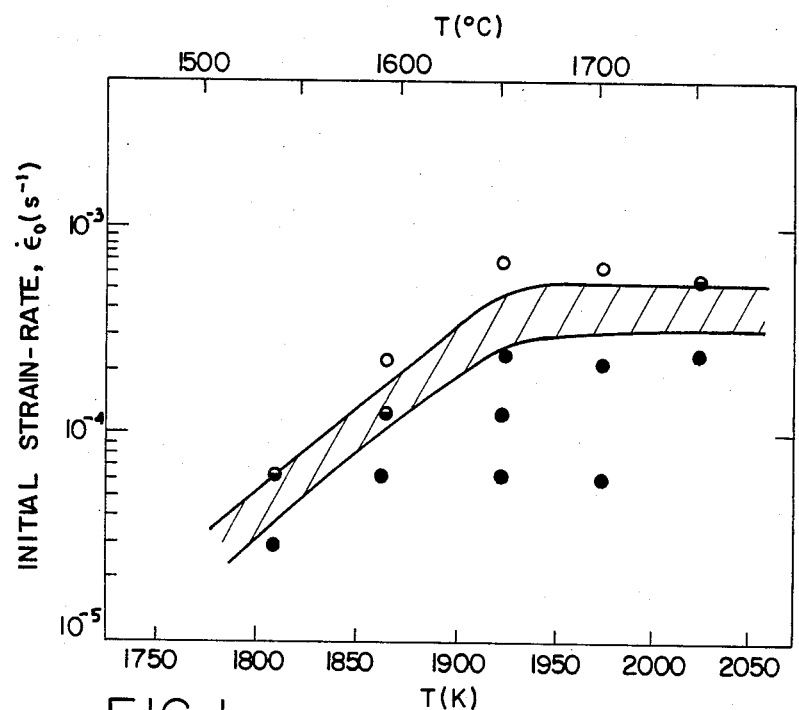
FIG. 1 is a graph of strain rate versus temperature and graphically presents results of the detailed working example herein.

Turning firstly to preparation of the starting powder, i.e. step (a) described above, the silicon nitride ingredient is preferably utilized in an amount ranging from about 83% to about 99% by weight of the total ingredients (i.e. silicon nitride powder, liquid phase forming additive and any free silicon ingredient). Typically it is employed as a finely divided pulverulent material having an average particle size ranging from about 0.005 $\mu$m to about 10.0 $\mu$m and preferably from about 0.005 $\mu$m to about 1.0 $\mu$m. The silicon nitride ingredient frequently contains silica ($SiO_2$) as a surface contaminant; this $SiO_2$ counts as part of the silicon nitride ingredient and not as liquid phase forming additive. The silicon nitride ingredient as produced can have residual silicon in the central core region due to incomplete nitride formation. This counts as silicon nitride ingredient and not as silicon additive as it does not have the densification enhancing effect that addition of free silicon does since it is isolated from the liquid phase.

Turning now to the liquid phase forming additive, this is used in a liquid phase forming amount and preferably in an amount ranging from about 1% to about 17% by weight of the total ingredients. Typically it is employed as a finely divided pulverulent material having an average particle size ranging from about 0.005 $\mu$m to about 50.0 $\mu$m and preferably from about 0.005 $\mu$m to about 1.0 $\mu$m. Suitable liquid phase forming additives include, for example, magnesia (MgO), yttria ($Y_2O_3$), zirconia ($ZrO_2$), alumina ($Al_2O_3$), aluminum nitride (AlN), ceria ($CeO_2$), and silica ($SiO_2$) or mixtures thereof. Magnesia (MgO) is the preferred additive; it is preferably admixed in the form of $Mg(NO_3)_2 \cdot 6H_2O$ and the amount of this utilized is calculated on an MgO basis.

The silicon additive is free silicon and is used to enhance densification in the sintering step (c), and in the forging step (d) if further densification occurs during forging. It is added in a densification enhancing amount, preferably in an amount ranging from about 1% to about 7% by weight of the total ingredients. Typically, it is employed as a finely divided pulverulent material having an average particle size ranging from about 0.005 $\mu$m to about 50.0 $\mu$m and preferably from about 0.005 $\mu$m to about 1.0 $\mu$m. The use of free silicon to enhance densification in forming silicon nitride ceramics is described in Raj et al. U.S. Pat. Nos. 4,487,840 and 4,552,711.

The ingredients are mixed and blended to form the starting powder by dry mixing or wet mixing techniques which are well known in the art to obtain at least gross uniformity. The wet mixing process is preferred as it provides better uniformity. The percentages of ingredients as set forth above are based on what is subjected to wet or dry mixing as such percentages can change as a result of the mixing operation.

In a typical dry mixing process the various powders are suspended in a liquid vehicle, the admixture is milled and the vehicle is evaporated.

In a typical wet mixing process, liquid phase forming additive is dissolved in a liquid vehicle and the other ingredients are suspended in the solution which is dried to yield a powder mixture which is calcined, e.g. at a temperature ranging from about 60° C. to about 1100° C., and the calcined powder is then processed according to the dry mixing procedure set forth above.

The starting powder material so formed typically has a particle size ranging from about 0.005 $\mu$m to about 50 $\mu$m and preferably from about 0.005 $\mu$m to about 1.0 $\mu$m.

Turning now to the cold pressing step, i.e. step (b) above, this is readily carried out, for example, by first cold compacting in a double action die to 7 to 50 megapascals and then enclosing the formed workpiece and cold isostatically pressing (i.e., using a device wherein pressure is transmitted via liquid, such as oil, to the workpiece which is surrounded by the liquid) to 100 to 350 megapascals. Preferably, this step is carried out to obtain a green density ranging from about 45% to about 65% of theoretical density.

Turning now to the sintering step, i.e. step (c) above, this step is preferably carried out at a temperature ranging from about 1500° C. to about 1800° C. in a nitrogen atmosphere to obtain a density which ranges from about 75% to about 90% of theoretical density. When the densities obtained are less than 75%, further densification is readily obtained in the forging step, i.e. in step (d) described above.

Turning now to the forging step, i.e. step (d) herein, this is preferably carried out at a temperature ranging from about 1500° C. to about 1800° C. in a nitrogen atmosphere utilizing an open die. The term "open die" is used herein to mean a die wherein on pressing the workpiece does not contact the die sidewall. A closed die (i.e. a die where on pressing the workpiece does contact die sidewall) is also an alternative especially where the preform from sintering has a density less than 75% of theoretical density and minimizes the need for finish machining. The die is preferably of high density graphite and is desirably coated with a thin coating of boron nitride to prevent reaction between the die surface and the workpiece and to ease removal of the forged piece. Very preferably step (d) is carried out utilizing substantially the maximum strain rate where surface cracks do not occur and the minimum temperature where said substantially maximum strain rate produces no surface cracks. This minimizes processing time and energy requirements.

Step (d) is readily carried out utilizing constant displacement rate, constant strain rate, constant load or constant stress, preferably utilizing a temperature ranging from about 1500° C. to about 1800° C.

The constant displacement rate method is readily carried out by placing the preform formed in sintering step (c) on a support structure (e.g. the bottom half of a die or a flat platen, preferably of graphite) in a furnace providing the appropriate temperature and utilizing a piston (e.g. a screw or hydraulic or pneumatic driven piston such that displacement rate is controllable) with portion inside the furnace preferably of graphite to press the workpiece from above moving the piston at a constant displacement rate which is readily determined from the equation $$\dot{L} = \dot{\epsilon}_0 h$$

wherein $\dot{\epsilon}$ is the displacement rate, $\dot{\epsilon}_0$ is the initial strain rate, and h is workpiece height and initial strain rate $\dot{\epsilon}_0$ preferably ranges from about $10^{-6}$ to about $10^{-2}$ seconds$^{-1}$ and is selected to be such that surface cracks do not occur. The term "displacement rate" is used herein to mean the relative rate of approach of the upper movable piston relative to the bottom piston or platform or other support structure. In this method the strain rate keeps increasing as the forging progresses. For example, if the initial strain rate is $2 \times 10^{-4}$ seconds$^{-1}$, then strain rate increases to $4 \times 10^{-4}$ seconds$^{-1}$ (i.e. became twice the initial value) when the height of the preform or the workpiece is reduced by half the initial height.

The constant strain rate method is readily carried out utilizing apparatus as used for the constant displacement method wherein piston movement is controlled responsive to a microprocessor programmed to vary displacement rate as workpiece height decreases to maintain constant strain rate in accordance with the equation $$\dot{L} = \dot{\epsilon} h$$

wherein $\dot{L}$ is the displacement rate, $\dot{\epsilon}$ is strain rate and h is workpiece height. Preferably this method is carried out utilizing a strain rate in the range of about $2 \times 10^{-5}$ to about $10^{-3}$ seconds$^{-1}$.

The constant load method is readily carried out with the same apparatus as disclosed for the constant displacement method by moving the piston by a constant load force (utilizing a constant load weight positioned on the piston to move the piston). The load P is readily calculated from the equation $P = 2\sigma A$ where A is the initial cross-sectional area of the workpiece (i.e. the cross-sectional area of the sintered preform) and the factor of 2 is used to account for the increase in area during the forging process as the preform gradually assumes the shape of the final part and $\sigma$ is the stress that corresponds to initial strain rates as set forth above for the constant displacement rate method.

The constant stress method is readily carried out with apparatus as described for the constant displacement method modified to include variable load applying means where varying of the load is controlled responsive to a microprocessor programmed to vary load as workpiece cross-sectional area increases to provide a constant stress in accordance with the equation $$P = \sigma A$$

where P is the load, $\sigma$ is stress and A is the cross-sectional area of the workpiece. Flow stresses should be less than 100 megapascals and preferably range from about 5 to about 50 megapascals.

In each of the four methods described above for step (d), the forging (i.e. pressing) is stopped when appropriate dimensions of the part being formed have been achieved as estimated from the total displacement applied to the piston utilized for the pressing.

As previously indicated the conditions of forging are selected so that no surface cracks occur in the workpiece. The term "surface cracks" is used herein to mean cracks visible to the naked eye as well as fine cracks that can be observed under magnification of 70×.

The conditions of forging are readily selected empirically, e.g. by deforming preform samples (i.e. already processed through the sintering step) at a plurality of strain rates and temperatures and determining whether cracks occur and graphing the results in terms of strain rates and temperatures and selecting strain rates and temperatures in the area of the graph where processed samples did not exhibit surface cracks. Typically, this can be carried out in uniaxial compression tests utilizing compression rods (i.e. push rods or pistons or anvils), and cylindrical preform specimens positioned with flat face against the compression rod.

In a preferred method of empirical determination, cylindrical preform samples (i.e. already processed through the sintering step) having a diameter ranging from about 5 to about 10 mm and a height ranging from about 5 to about 15 mm are forged, i.e. isothermally pressed by means of a constant displacement rate tester (e.g. an Instron Universal Testing Machine manufactured by Instron Corp. of Canton, Mass., which is conventionally referred to as an Inston Tester or Instron Machine) under open die conditions in a nitrogen atmosphere in a furnace in a range of constant temperatures and displacement rates (the piston attached to the crosshead of the Instron Tester is moved at a selected constant displacement rate and a selected temperature is provided in the furnace) to reduce the height by about 30% to about 60% and noting which of the samples are free of surface cracks and graphing the results in terms of initial strain rates determined from the equation $\dot{L} = \dot{\epsilon}_0 h$ (described hereinbefore) versus temperatures and selecting strain rates and temperatures for use in step (d) in the area of the graph where the processed samples did not exhibit surface cracks. The graph obtained indicates a safe area on and under a curve which initially increases with increasing temperature to a maximum initial strain rate. Preferably step (d) is carried out utilizing an initial strain rate (in constant displacement rate forging) that is substantially the maximum one where no surface cracks were noted in the testing of the samples and at the minimum temperature where testing indicated said substantially maximum strain rate produces no surface cracks.

Recording of load and displacement during said testing provides data for making up stress vs strain rate curves whereby the strain rates determined by testing are convertible to stress and load for use in carrying out step (d) by constant load and constant stress methods.

After step (d) is completed some finish machining may be required to clean the edges. Close tolerances are obtained in open die processing by selection of preform shape and carrying out of step (d) to appropriate displacement. The processing provides uniform parts meeting close tolerances and containing a minimum of flaws. The parts demonstrate a high degree of reliability, i.e. uniformity in resistance to failure in use. Generally the produced part has an excellent surface finish and polishing is not necessary.

The process herein is illustrated in the following detailed example wherein convex lens shaped parts are obtained from intermediate cylindrical preforms.

EXAMPLE

Convex lens shaped parts were fabricated from magnesia and silicon doped silicon nitride.

A starting powder was made up utilizing the following ingredients

| Material | % By Weight |
|---|---|
| Silicon Nitride (99.9% purity) | 93 |
| Magnesium Oxide | 5 |
| Silicon (99.5% purity, −325 mesh) | 2 |

The magnesium oxide was added in form of $Mg(NO_3)_2.6H_2O$ (analytical reagent grade).

The magnesium nitrate was dissolved in isopropyl alcohol at 60° C. Silicon nitride powder and silicon were added to the solution which was then dried to yield a powder mixture. The mixture was calcined at 700° C. for two to four hours. The powder was then ball milled with tungsten carbide balls for twelve hours using isopropyl alcohol as the suspension medium. The suspension was flash evaporated to yield the final powder mixture.

The powder was first cold-compacted in a double action die to 35 megapascals. The billets were then enclosed in latex balloons and cold isostatically pressed to 200 megapascals. The billets were round cylinders with a green density of 1.7 megagrams per cubic meter. The diameter ranged from 6 mm to 25 mm. The cold isostatically pressed billets were sintered in nitrogen atmosphere for 0.5 hours at 1650° C. This yielded specimens for testing to determine suitable forging conditions and for forging. The density of these specimens ranged from 80% to 85% of the theoretical.

Testing to determine forging conditions was carried out on cylindrical billets 6 mm in diameter and 12 mm in height under uniaxial compression. The testing was carried out in a nitrogen atmosphere in a furnace fitted to an Instron Tester. The push rods or the pistons were made of graphite and the top piston was movable at a constant displacement rate. Runs were carried out at a plurality of temperatures and at constant displacement rates corresponding to a plurality of initial strain rates. All specimens were strained up to 40% to 50% reduction in height. The presence or absence of surface cracks were noted and the data was graphed with the results shown in FIG. 1. The solid filled in dots represent samples which displayed no cracks. The part filled in dots represent samples where small surface cracks were observable. The dots which are not filled in represent samples which displayed substantial cracks. The hatched area in FIG. 1 represents the demarcation between conditions where no cracking occurs and conditions where cracking occurs. Under conditions within the hatched area, cracking may or may not occur. The area below the hatched area represents conditions where no cracking occurs, i.e. the safe area. As seen from FIG. 1, the maximum safe initial strain rate is $2 \times 10^{-4}$ seconds$^{-1}$ and cracking may not occur at initial strain rates between $5 \times 10^{-4}$ and $2 \times 10^{-4}$ seconds$^{-1}$. As seen from the graph, the minimum temperature where such maximum strain rate produced no cracks was about 1650° C.

Forging, i.e. step (d), was then carried out on the sintered cylindrical preforms (about 8 mm in height and about 22 mm in diameter) to form lens shaped parts at 1650° C. and an initial strain rate of $2 \times 10^{-4}$ seconds$^{-1}$ under uniaxial compression utilizing apparatus consisting of a piston and die positioned in a furnace. The forging consisted of isothermal pressing in an open die and was carried out at a constant displacement rate of 0.1 millimeters per minute in nominally pure nitrogen. The die was of boron nitride coated graphite and graphite pistons were utilized having a round cross section with a diameter of 26 millimeters. The furnace was tungsten mesh and contained radiation shields of tungsten and molybdenum.

In the forging there was shear deformation of greater than 30%.

The as-forged specimens had a density greater than 98% of theoretical density.

The surfaces of the as-forged specimens were smooth and had an excellent finish. All surfaces including the curved edge were free of cracks including microcracks.

Figure 2:
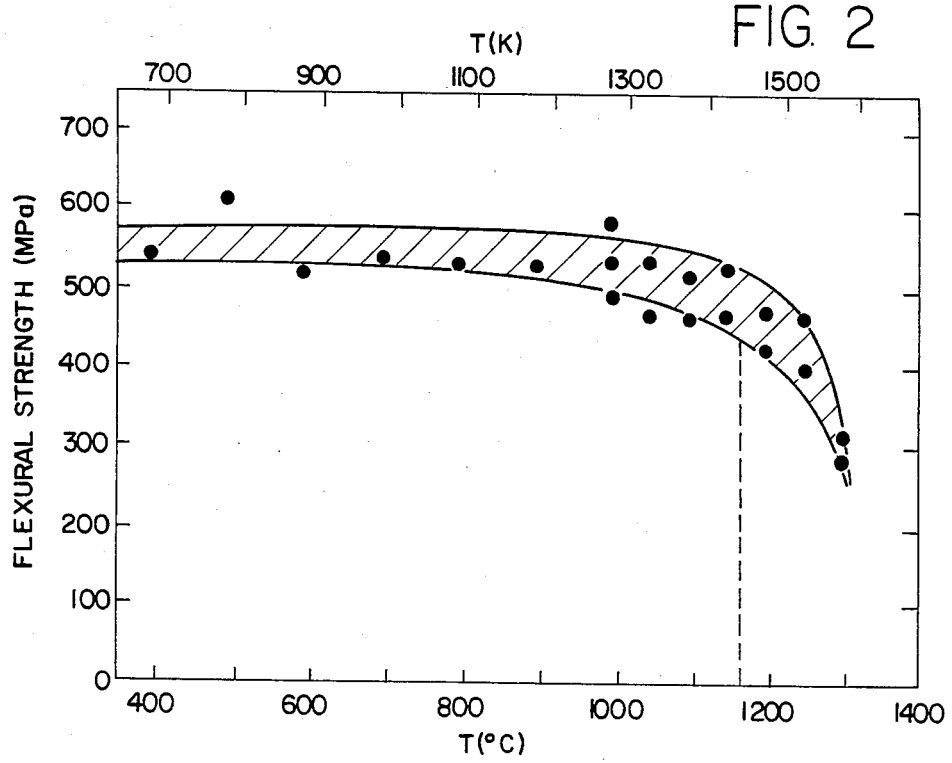
FIG. 2 is a graph showing flexural strength at various temperatures for various specimens processed in the detailed working example herein.

Specimens for flexural strength measurements were cut from 11 forged specimens. The modulus of rupture was measured in three point bending at a constant crosshead displacement rate of 0.5 millimeters/minute with a screw-driven mechanical testing machine equipped with a tungsten mesh element furnace. All tests other than room temperature were done in nitrogen atmosphere. The specimens were approximately 22 millimeters long, 4 millimeters wide, and 2 millimeters thick. Specimens were ground on SiC papers up to 600 grit. Edges were not beveled. The results are shown in FIG. 2 (wherein flexural strength in megapascals is related to temperature). Each point on the graph represents test results on one specimen. Considering that the specimens came from different forgings, the relatively narrow scatter in the data indicates high reliability (uniform strengths) in components fabricated by the forging process herein.

An important result is that the samples retain their maximum flexural strength to approximately 1160° C. which is a higher temperature than is associated with strength retention in various commercial ceramics.

Figure 3:
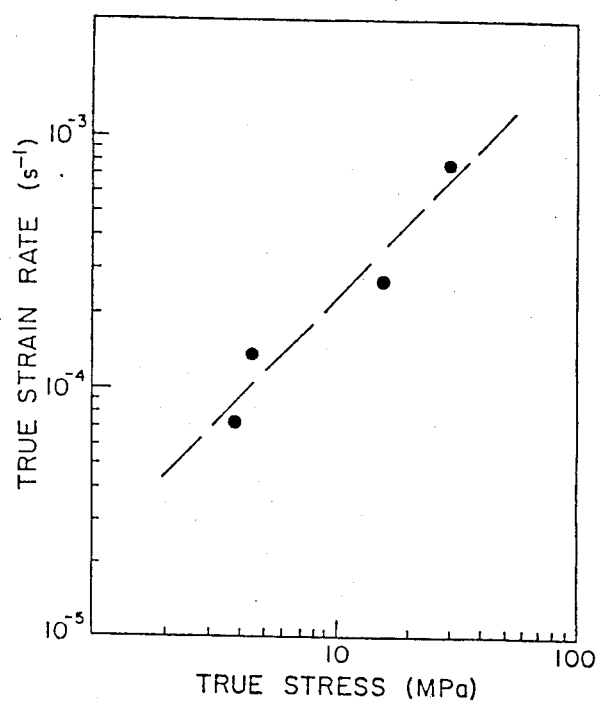
FIG. 3 is a graph of strain rate versus stress and graphically presents results of the detailed working example herein.

Data for preparing a graph of flow stress versus strain rate at 1650° C. was obtained utilizing the Instron Tester described above and recording load and displacements. The graph prepared from the data is depicted in FIG. 3 wherein strain rates in seconds$^{-1}$ are related to stress in megapascals. The slope of the curve is approximately 1 indicating n in the equation $\dot{\epsilon} = C\sigma^n$ is approximately 1 and therefore that superplasticity was obtained, i.e. that superplastic forging was carried out.

It has been discovered herein that the process as above described is beneficial generally in forming near net shape parts of nitride ceramics or of composites thereof with titanium carbide particles. In particular, it has been discovered herein that such processing produces parts which are relatively flaw free and need little or no machining.

In particular it has been found that such a process for preparing near net shape parts of nitride ceramics or composites thereof with titanium carbide particles, comprises the steps of (a) providing a starting powder comprising by weight from about 70% to about 99% nitride ingredient and from 30% to about 1% oxide additive, (b) cold pressing to obtain a preform green density ranging from about 30% to about 75% of theoretical, (c) sintering at atmospheric pressure in a nitrogen atmosphere at a sintering effective temperature in the range of 800° C. to about 2200° C. to obtain a density which ranges from about 50% to about 100% of theoretical density and which is higher than said preform green density, (d) isothermally pressing in an open die or in a closed die to substantially final shape in a nitrogen atmosphere utilizing a temperature within the range of about 1300° C. to about 2200° C. and a strain rate within the range of about $10^{-7}$ to about $10^{-1}$ seconds$^{-1}$, the temperature and strain rate being such that surface cracks do not occur, said pressing being carried out to obtain a shear deformation greater than 30% whereby superplastic forging is effected.

Nitride ceramics in addition to silicon nitrides include, for example, aluminum nitride or titanium nitride.

When the process herein is utilized to prepare ceramics including titanium carbide particles, these generally have a maximum dimension ranging from about 0.1 to about 5 μm and are included in the starting powder in an amount ranging from about 1% to about 30% by volume so that the starting powder comprises from about 1% to about 30% by volume titanium carbide particles and from about 99% to about 70% by volume of nitride plus oxide additive.

Suitable oxide additives include, for example, those previously recited as liquid phase forming additives and also $Li_2O$, $CaO$, $MgO-SiO_2$ (talc), $B_2O_3$, $NiO$ and $Cr_2O_3$.

In respect to aluminum nitride ceramics, the starting powder normally contains from about 4% to about 6% oxide additive and step (c) is preferably carried out at a temperature ranging from about 800° C. to about 1700° C. and step (d) is preferably carried out at a temperature ranging from about 1800° C. to about 1400° C. and a strain rate within the range of about $10^{-6}$ to about $10^{-2}$ seconds$^{-1}$ (corresponding to a stress range of 1 to 100 megapascals) such that surface cracks do not occur.

In respect to composites of nitrides with particulate titanium carbide, a preferred composite includes silicon nitride as the nitride and step (c) is preferably carried out at a temperature ranging from about 1400° C. to about 2000° C. and step (d) is preferably carried out at a temperature ranging from about 1400° C. to about 2000° C. and a strain rate within the range of about $10^{-5}$ to about $10^{-6}$ seconds$^{-1}$ (corresponding to a stress range of about 5 to about 100 megapascals such that surface cracks do not occur. The term "essentially 1750° C." is used herein to mean the temperature represented by the filled in dot farthest to viewer's right in FIG. 1.

Other will be evident to those skilled in the art. Therefore the scope of the invention is intended to be defined by the claims.

What is claimed is:

1. A process for preparing silicon nitride ceramic parts which are relatively flaw free and which need little or no machining, said process comprising the steps of (a) preparing a starting powder by wet or dry mixing ingredients comprising by weight from about 70% to about 99% silicon nitride, from about 1% to about 30% of liquid phase forming additive and from 1% to about 7% free silicon;

(b) cold pressing to obtain a preform of green density ranging from about 30% to about 75% of theoretical density;

(c) sintering at atmospheric pressure in a nitrogen atmosphere at a temperature ranging from about 1400° C. to about 2200° C. to obtain a density which ranges from about 50% to about 100% of theoretical density and which is higher than said preform green density, and (d) press forging workpiece resulting from step (c) by isothermally uniaxially pressing said workpiece in an open die without initial contact between said workpiece and die wall perpendicular to the direction of pressing and so that pressed workpiece does not contact die wall perpendicular to the direction of pressing, to substantially final shape in a nitrogen atmosphere utilizing a temperature within the range of from about 1400° C. to essentially 1750° C. and strain rate within the range of about $10^{-7}$ to about $10^{-1}$ seconds$^{-1}$, the temperature and strain rate being such that surface cracks do not occur, said pressing being carried out to obtain a shear deformation greater than 30% whereby superplastic forging is effected.

2. A process as recited in claim 1 wherein the composition subjected to wet or dry mixing in step (a) comprises by weight from about 83% to about 99% silicon nitride, from about 1% to about 17% of liquid phase forming additive selected from the group consisting of magnesia, yttria, zirconia, alumina, aluminum nitride, ceria, and silica or mixtures thereof, 3. A process as recited in claim 2 wherein the cold pressing in step (b) is carried out to obtain a green density ranging from about 45% to about 65% of theoretical density.

4. A process as recited in claim 3 wherein the sintering in step (c) is carried out at a temperature ranging from about 1500° C. to about 1800° C. to obtain a density which ranges from about 75% to about 90% of theoretical density.

5. A process as recited in claim 4 wherein step (d) is carried out utilizing a temperature ranging from about 1500° C. to essentially 1750° C.

6. A process as recited in claim 5 wherein step (d) is carried out by pressing utilizing a piston moved at a constant displacement rate such that he initial strain rate ranges from about $10^{-6}$ seconds$^{-1}$ to about $10^{-2}$ seconds$^{-1}$.

7. A process as recited in claim 1 wherein strain rate and temperature are selected based on testing of cylindrical preform samples having a diameter of 5 to 10 mm and a height of about 5 to 15 mm by isothermally pressing in a nitrogen atmosphere in a range of constant displacement rates and temperatures to reduce the height about 30 to about 60% and determining which of the processed samples are free of surface cracks and graphing the results in terms of initial strain rates versus temperature and selecting strain rates and temperatures in the area of the graph where the processed samples did not exhibit surface cracks.

8. A process as recited in claim 7 wherein the initial strain rate selected is substantially the maximum one where no surface cracks were noted in the testing of the samples.

9. A process as recited in claim 8 wherein the temperature selected for step (d) is substantially the minimum temperature where testing indicated said substantially maximum initial strain rate produces no surface cracks.

10. A process as recited in claim 1 wherein the conditions of step (d) are selected empirically.

11. A process for preparing near net shape parts of nitride ceramics or composites thereof with titanium carbide particles, said process comprising the steps of (a) providing a starting powder comprising by weight from about 70% to about 99% nitride ingredient and from 30% to about 1% oxide additive, and when said nitride ingredient comprises silicon nitride, from 1% to about 7% free silicon,
(b) cold pressing to obtain a preform of green density ranging from about 30% to about 75% of theoretical,
(c) sintering at atmospheric pressure in a nitrogen atmosphere at a sintering effective temperature in the range of 800° C. to about 2200° C. to obtain a density which ranges from about 50% to about 100% of theoretical density and which is higher than said preform green density,
(d) press forging workpiece from step (c) by isothermally uniaxially pressing said workpiece in an open die so that said workpiece does not contact die wall perpendicular to the direction of pressing, to substantially final shape in a nitrogen atmosphere utilizing a temperature within the range of from about 1300° C. to essentially 1750° C. when no titanium carbide is present and to about 2000° C. when titanium carbide is present, and a strain rate within the range of about $10^{-7}$ to about $10^{-1}$ seconds$^{-1}$, the temperature and strain rate being such that surface cracks do not occur, said pressing being carried out to obtain a shear deformation greater than 30% whereby superplastic forging is effected.

12. A process as recited in claim 1, wherein step (d) is carried out utilizing a temperature ranging from about 1500° C. to essentially 1750° C.

* * * * *

UNITED STATES PATENT AND TRADEMARK OFFICE
CERTIFICATE OF CORRECTION

PATENT NO. : 4,732,719

DATED : March 22, 1988

INVENTOR(S) : Prakash C. Panda et al

It is certified that error appears in the above-identified patent and that said Letters Patent is hereby corrected as shown below:

On the cover page change the recitation of the assignee to be as follows:

Assignee: Jupiter Technologies, Inc., Ithaca, New York
                 Cornell Research Foundation, Inc.,
                 Ithaca, New York Signed and Sealed this Sixteenth Day of August, 1988

Attest:

DONALD J. QUIGG

*Attesting Officer*         *Commissioner of Patents and Trademarks*